United States Patent [19]

Waxelbaum et al.

[11] 4,089,935

[45] May 16, 1978

[54] RECOVERY OF CALCIUM HYPOCHLORITE VALUES FROM FILTER MEDIA EMPLOYED IN THE FILTRATION OF CA(OCL)₂ SLURRIES

[75] Inventors: Paul M. Waxelbaum; Duane A. Huston, both of Cleveland, Tenn.

[73] Assignee: Olin Corporation, New Haven, Conn.

[21] Appl. No.: 703,391

[22] Filed: Jul. 8, 1976

[51] Int. Cl.² .................. C01B 11/04; B08B 7/00; B01J 1/00
[52] U.S. Cl. .................. 423/474; 23/293 R; 134/10
[58] Field of Search ........... 423/474, 158; 210/77, 210/400, 216, 217, 81; 23/293 R; 134/10, 28

[56] References Cited

U.S. PATENT DOCUMENTS

| | | | |
|---|---|---|---|
| 2,007,429 | 7/1935 | Klopstock | 423/474 |
| 2,022,069 | 11/1935 | Whitmore | 210/77 |
| 2,320,635 | 6/1943 | Mericola et al. | 423/474 |
| 3,152,986 | 10/1964 | Bice et al. | 210/217 |

*Primary Examiner*—O. R. Vertiz
*Assistant Examiner*—Wayne A. Langel
*Attorney, Agent, or Firm*—James B. Haglind; Donald F. Clements; Thomas P. O'Day

[57] ABSTRACT

A process is described for recovering calcium hypochlorite values from the filter media employed in the filtration of calcium hypochlorite slurries. Deposits of $Ca(OCl)_2$ along with insoluble materials adhering to the filter media are washed with an aqueous solution of calcium hypochlorite to form a slurry of calcium hypochlorite solids. Water is used to wash the filter media to dissolve any remaining $Ca(OCl)_2$ and form a solution of calcium hypochlorite. The slurry and solution are then admixed to provide a solution of calcium hypochlorite whose concentration is controlled within the range of from about 45 to about 215 grams per liter of $Ca(OCl)_2$. This solution is employed in the production of calcium hypochlorite and is recycled to the washing step.

10 Claims, 1 Drawing Figure

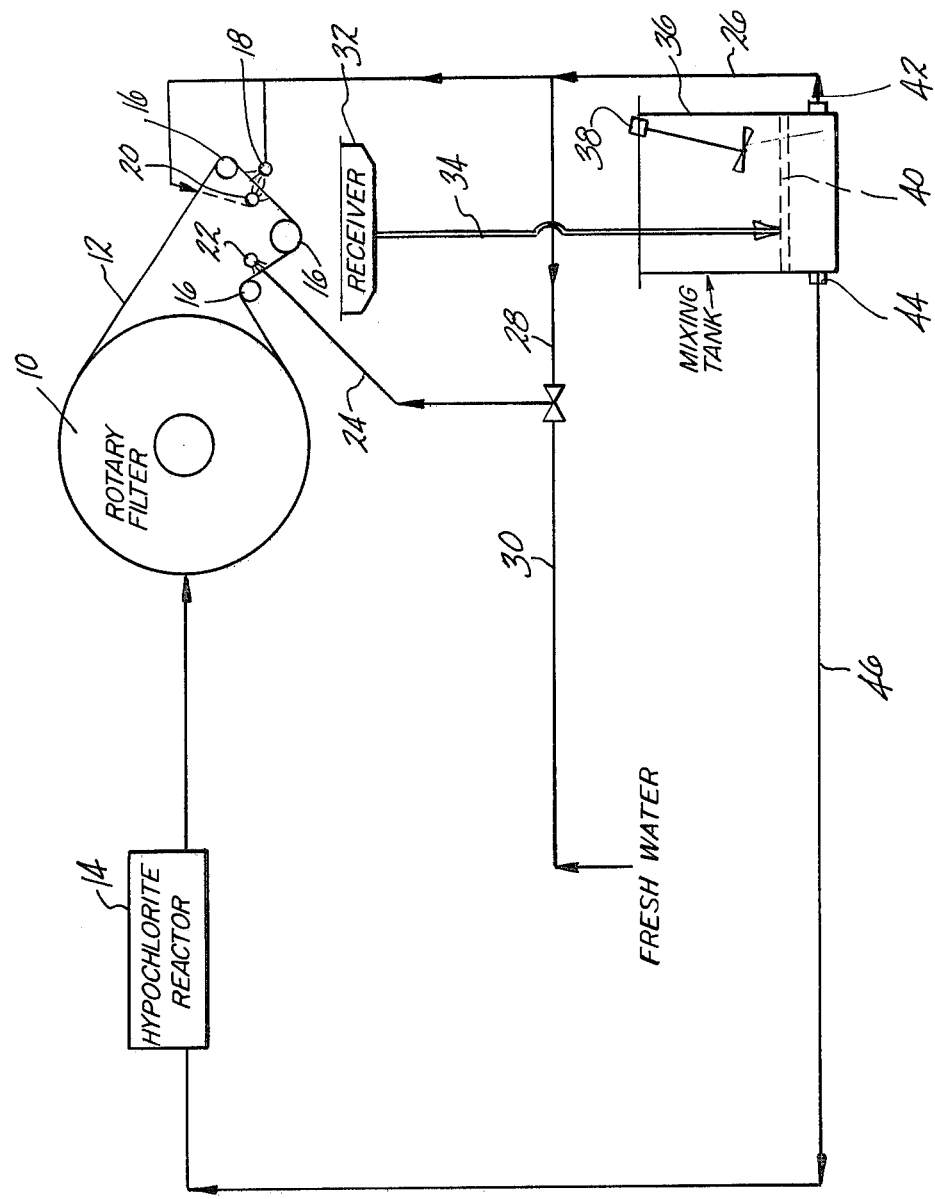

RECOVERY OF CALCIUM HYPOCHLORITE VALUES FROM FILTER MEDIA EMPLOYED IN THE FILTRATION OF CA(OCL)₂ SLURRIES

This invention relates to the recovery of calcium hypochlorite values from aqueous solutions employed in washing filter media in the manufacture of calcium hypochlorite. Calcium hypochlorite is a commercial bleaching and sanitizing agent used particularly in the disinfection of swimming pool waters.

In the production of calcium hypochlorite, filter media are employed for product recovery which require washing to prevent "blinding" or a buildup of deposits on the filter media. A buildup of deposits results in reduced filtration, a product having a higher liquid content, and increased costs for drying the product along with greater product losses.

Previously, the filter media was washed with fresh water and the wash solution discarded as a waste solution. This practice, however, resulted in significant losses of raw materials. In addition, the solutions pose a pollution problem if, for example, they are added to public waterways such as rivers and streams. Treatment of the waste solutions to make them suitable for discharge incurs additional costs.

It is known to recycle wash water which has been used to wash the calcium hypochlorite product, as described in United States Pat. No. 2,320,635, issued to F. C. Mericola et al, where solid calcium hypochlorite is washed to remove occluded mother liquor and the mother liquor, which is saturated with calcium hypochlorite, is returned to the reactor as its high concentration of salts does not cause a dilution of the solutions employed in the process.

Wash water from cleaning the filter media, however, is a very dilute slurry containing particulate calcium hypochlorite and insoluble materials such as slimes. Employing this slurry directly in the hypochlorite reactor would upset the water balance of the process as well as increase the amounts of insoluble materials in the reaction product.

It is an object of the present invention to provide a process for the recovery of valuable materials from aqueous solutions obtained in the production of calcium hypochlorite.

Another object of the present invention is to provide a means of minimizing pollution of water resources by eliminating the need for disposing of contaminating liquids to sewer systems or public waterways.

These and other objects of the invention will be apparent from the following description of the invention.

Briefly, a process for recovering calcium hypochlorite values from the filter media containing deposits of calcium hypochlorite solids employed in the filtration of a first aqueous slurry of solid calcium hypochlorite formed in a calcium hypochlorite reactor comprises the following steps:
 a. Washing the filter media with a first aqueous solution of calcium hypochlorite to remove the deposits from the filter media and form a second slurry of calcium hypochlorite solids;
 b. Collecting the second slurry in a receiver means;
 c. Washing the filter media from step a with water to dissolve any remaining calcium hypochlorite to form a second solution of calcium hypochlorite;
 d. Collecting the second solution from step c in the receiver means;
 e. Admixing the second solution and the second slurry to dissolve said calcium hypochlorite solids in the second slurry and form a third solution of calcium hypochlorite; and
 f. Recycling a portion of the third solution to step a as the first aqueous solution.

The figure illustrates the process of the present invention in which a rotary drum filter 10, having filter cloth 12 receives calcium hypochlorite slurry (not shown) from hypochlorite reactor 14 and filters the slurry. After removal of the slurry, filter cloth 12 is washed while passing over rollers 16 by spraying a calcium hypochlorite solution through spraying heads 18 and 20. Spraying head 22 is supplied through line 24 with calcium hypochlorite solution fed through lines 26 and 28 or fresh water fed through line 30. The washing slurries containing calcium hypochlorite particles, insoluble calcium carbonate, and slimes, are collected in receiver tank 32 and returned to mixing tank 36 via line 34. Agitator 38 mixes the washing slurries to dissolve the calcium hypochlorite particles. Screens 40 remove the insoluble material. A portion of the calcium hypochlorite solution is removed from outlet 42 of mixing tank 36 to be recycled through line 26 to spraying heads 18, 20, and 22. Another portion of the calcium hypochlorite solution is removed through outlet 44 and fed through line 46 to hypochlorite reactor 14, where it is mixed with lime and chlorinated to form the calcium hypochlorite slurry to be filtered.

More in detail, the slurry of solid calcium hypochlorite is filtered on any suitable filter employing a filter media, such as a rotary drum filter, filter press type, or the like. The filter media is any suitable material which is resistant to and non-reactive with calcium hypochlorite.

Suitable filter media include fabrics of plastic materials such as polyolefins, polytetrafluoroethylene, and cotton.

Following filtration, a moist cake of calcium hypochlorite is removed from the filter media. Some of the calcium hypochlorite slurry is deposited on and retained by the filter media. A portion of this deposited $Ca(OCl)_2$ reacts with $CO_2$ present to form insoluble $CaCO_3$. Other insoluble materials in the form of slimes are also deposited on the filter media. Continuous cleaning of the filter media is thus required to prevent a buildup of material on the media which interferes with proper filtration and results in a hypochlorite cake having too high a water content and requiring excessive drying.

In the novel process of the present invention, the filter media is cleansed with an aqueous solution of water or calcium hypochlorite. Particles of calcium hypochlorite and insoluble materials are removed from the filter media as a slurry of calcium hypochlorite solids which is collected and fed to a mixing tank. The mixing tank has agitation means to redissolve the calcium hypochlorite particles to form a calcium hypochlorite solution. Insoluble materials are removed from the calcium hypochlorite solution by, for example, passing the solution through screens within the mixing tank or passing the solution through a solid-liquid separating device such as a filter or centrifuge. A portion of this solution is then recycled as the aqueous calcium hypochlorite used to wash the filter media.

In order to use the recovered $Ca(OCl)_2$ wash solution in other steps in the calcium hypochlorite production process, as well as prevent possible plugging of spraying devices and lines, it is necessary to control the concentration of calcium hypochlorite in the aqueous solution. Suitable concentrations of $Ca(OCl)_2$ in the aqueous solution include those from about 45 to about 215, and preferably from about 100 to about 200, and more preferably from about 165 to about 195 grams of $Ca(OCl)_2$ per liter of solution.

One way of accomplishing this concentration control for the aqueous calcium hypochlorite wash solution is to use an aqueous solution such as water to cleanse a portion of the filter media. As shown in the FIGURE, this water may be fed to one or more of the spraying devices to replace a portion of the aqueous calcium hypochlorite solution. The water containing deposited $Ca(OCl)_2$ along with other insoluble materials is collected and fed to the mixing tank to be admixed with the slurry of calcium hypochlorite solids obtained by washing the filter media with the aqueous calcium hypochlorite solution.

The $Ca(OCl)_2$ concentration of the solution in the mixing tank is controlled in one embodiment by employing sensing elements which monitor the concentration of the $Ca(OCl)_2$, for example, by determining the density of the solution. The sensing elements are connected to control means for operating a valve in the fresh water line. The set points on the sensing elements permit the density of the calcium hypochlorite to vary over a predetermined range. When, however, the density of the solution exceeds the desired concentration, the valve is opened and fresh water is fed to at least one of the spray devices to reduce the concentration of the aqueous calcium hypochlorite solution. When the density of the solution in the mixing tank falls below the desired level, the valve is closed so that fresh water is prevented from diluting the aqueous $Ca(OCl)_2$ solution being sprayed on the filter media.

In a preferred embodiment, the filter used for the calcium hypochlorite slurry is a rotary drum, roll discharge, continuous vacuum filter. The filter media is a woven mesh fabric. Spraying devices are positioned to spray the filter cloth after the $Ca(OCl)_2$ slurry has been discharged. The devices spray the aqueous $Ca(OCl)_2$ solution onto the filter cloth at varying pressures to remove material deposits remaining on the cloth. The spray devices may operate continuously or if desired, intermittently. To operate intermittently, the spray devices may be controlled by a timing device which variably controls the off-on periods, the time period suitably being related to the spraying pressures employed.

While the mixing tank may contain screens for removing insoluble matter from the calcium hypochlorite solution used to wash the filter media, it has also been found suitable to employ the mixing tank for redissolving the calcium hypochlorite solids by agitating the slurry and then to remove the insolubles in a separate apparatus.

In addition to being mixed with lime and the mixture chlorinated to form the calcium hypochlorite slurry, the concentrated calcium hypochlorite solution which is recovered from the filter media cleansing operation may be used in any of several steps of the calcium hypochlorite production process where it is desired to reduce the requirement for fresh water or recover the calcium hypochlorite values. For example, it may be used to remove particlate calcium hypochlorite from scrubbing apparatus used to recover calcium hypochlorite from gases employed in drying the calcium hypochlorite filter cake.

The following example is presented to illustrate the invention more fully. All parts and percentages are by weight unless otherwise specified.

Example

A slurry or "paste" of calcium hypochlorite was fed to a rotary drum filter having as the filter media a polypropylene cloth. The calcium hypochlorite slurry was filtered and calcium hypochlorite in cake form was removed from the filter media. The filter media, retaining particles of calcium hypochlorite along with other insoluble materials, was washed continuously by spraying a solution of calcium hypochlorite through two spray devices and calcium hypochlorite solution and/or fresh water through a third spray device, all spray devices operating at a pressure of 40 psig at the spray heads. The wash effluents were collected in a wash trough and flowed by gravity to a wash effluent mixer. The mixer was equipped with an agitator which agitated the effluent for about 15 minutes. Insoluble particles were removed by screens placed in the mixer. The concentration of the calcium hypochlorite wash solution was maintained within the range of 45 to 215 grams per liter of $Ca(OCl)_2$ by employing a density sensing unit which operated a valve in the fresh water line. Calcium hypochlorite wash solution was removed from a first outlet in the mixer and pumped back to the spray device at a rate of 26 gallons per minute. A portion of the calcium hypochlorite wash solution was removed from a second outlet in the mixer and pumped to a reactor, where it was blended with lime and then chlorinated to form the $Ca(OCl)_2$ slurry fed to the filter.

What is claimed is:

1. A process for recovering calcium hypochlorite values from a filter media containing deposits of calcium hypochlorite solids remaining on said filter media following the filtration of a first aqueous slurry of solid calcium hypochlorite to form a moist cake of calcium hypochlorite and removal of said cake from said filter media, said process which comprises the following steps:
   a. Washing said filter media with a first aqueous solution of calcium hypochlorite to remove said deposits from said filter media and form a second slurry of calcium hypochlorite solids;
   b. Collecting said second slurry in a receiver means;
   c. Washing said filter media from step (a) with water to dissolve any remaining calcium hypochlorite to form a second solution of calcium hypochlorite;
   d. Collecting said second solution from step (c) in said receiver means;
   e. Admixing said second solution and said second slurry to dissolve said calcium hypochlorite solids in said second slurry and form a third solution of calcium hypochlorite; and
   f. Recycling a portion of said third solution to step (a) as said first aqueous solution, said third solution of calcium hypochlorite being maintained at from about 45 to about 215 grams per liter of $Ca(OCl)_2$.

2. The process of claim 1 in which said concentration of said third solution is maintained by sensing means in co-operation with means for controlling the introduction of said water in step c.

3. The process of claim 2 in which said concentration in said third solution of calcium hypochlorite is maintained at from about 165 to about 195 grams per liter of $Ca(OCl)_2$.

4. The process of claim 3 in which a portion of said third solution is recycled for use in the production of said first aqueous slurry of solid calcium hypochlorite.

5. The process of claim 4 in which said filter media is attached to and supported on a rotary drum filter.

6. The process of claim 2 in which said sensing means determines the density of said third solution.

7. The process of claim 1 in which said second slurry of calcium hypochlorite solids contains insoluble materials which are removed prior to step f.

8. A process for recovering calcium hypochlorite values from a filter media containing deposits of calcium hypochlorite remaining on said filter media following the filtration of a first aqueous slurry of solid calcium hypochlorite to form a moist cake of calcium hypochlorite and removal of said cake from said filter media, said process which comprises the following steps:
   a. Washing said filter media with a first aqueous solution to remove said deposits from said filter media and form a second slurry of calcium hypochlorite solids;
   b. Collecting said second slurry in a receiver means;
   c. Admixing said second slurry of calcium hypochlorite solids with an aqueous calcium hypochlorite solution in a mixing means to dissolve said calcium hypochlorite solids and to form a second aqueous solution containing from about 45 to about 215 grams per liter of $Ca(OCl)_2$; and
   d. Recycling a portion of said second aqueous solution to step (a) as a portion of said first aqueous solution.

9. The process of claim 8 in which said second slurry of calcium hypochlorite solids contains insoluble materials which are removed prior to step (d).

10. The process of claim 9 in which said concentration of said second aqueous solution is maintained by density sensing means in co-operation with means for controlling the introduction of water in step (a).

* * * * *